United States Patent Office 2,744,992
Patented May 8, 1956

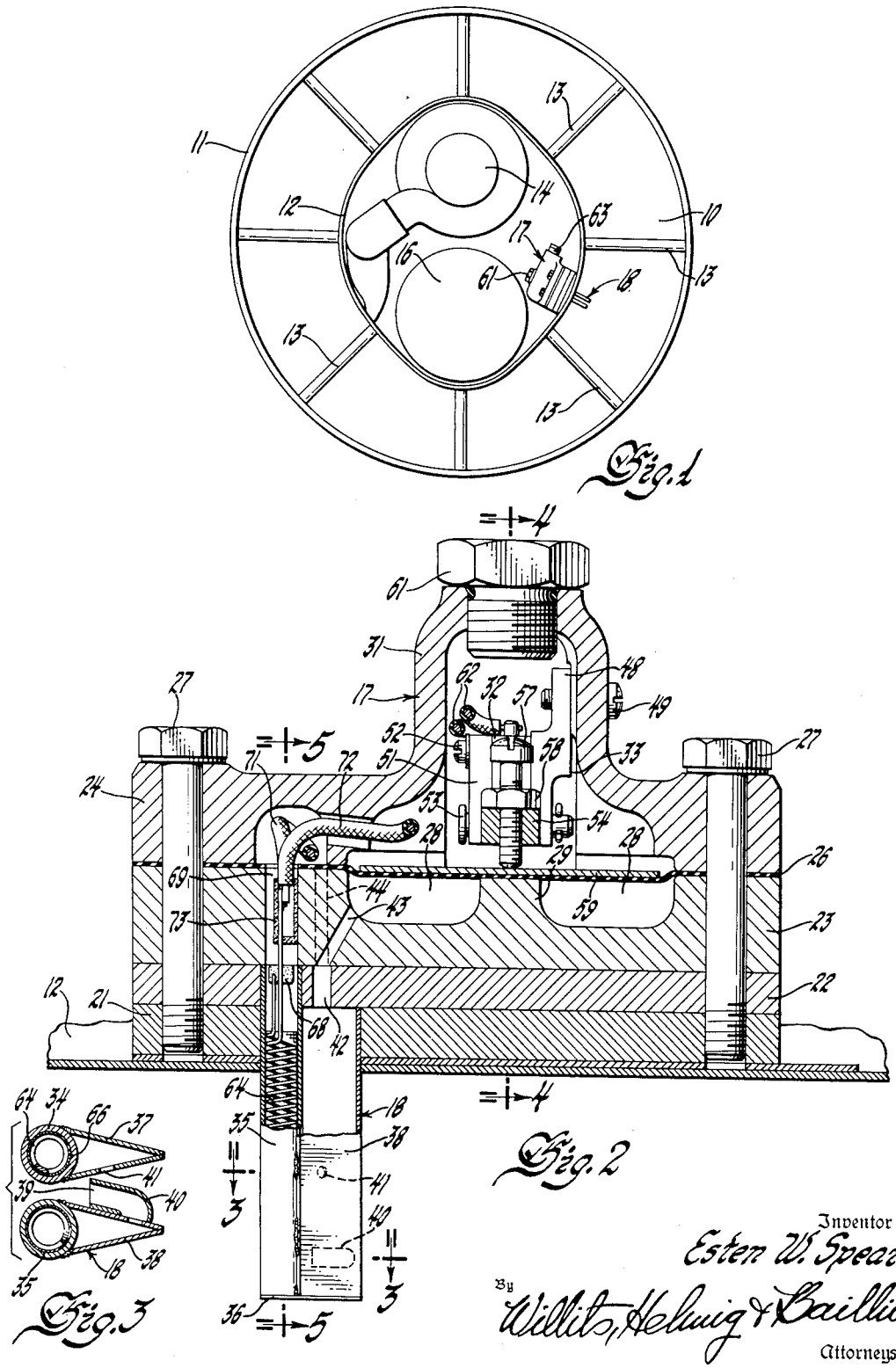

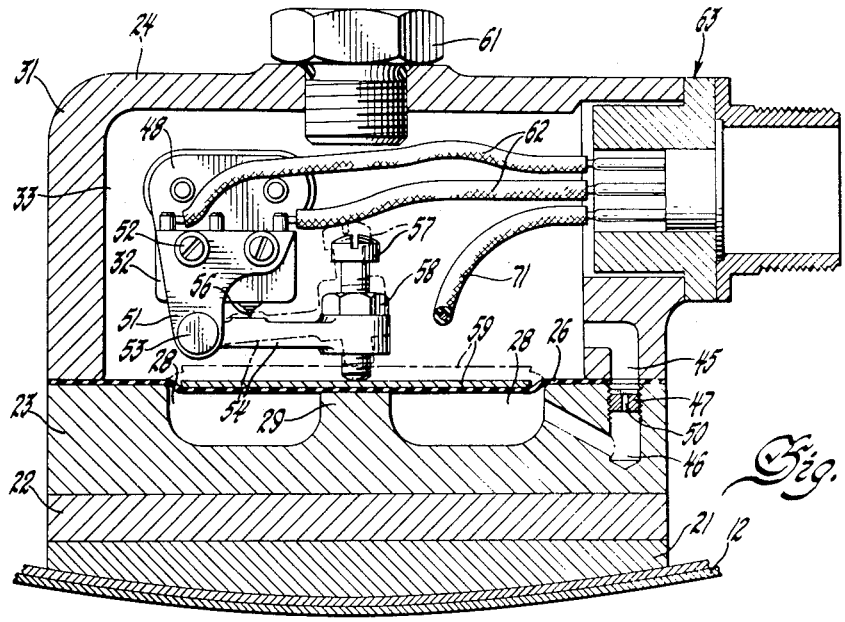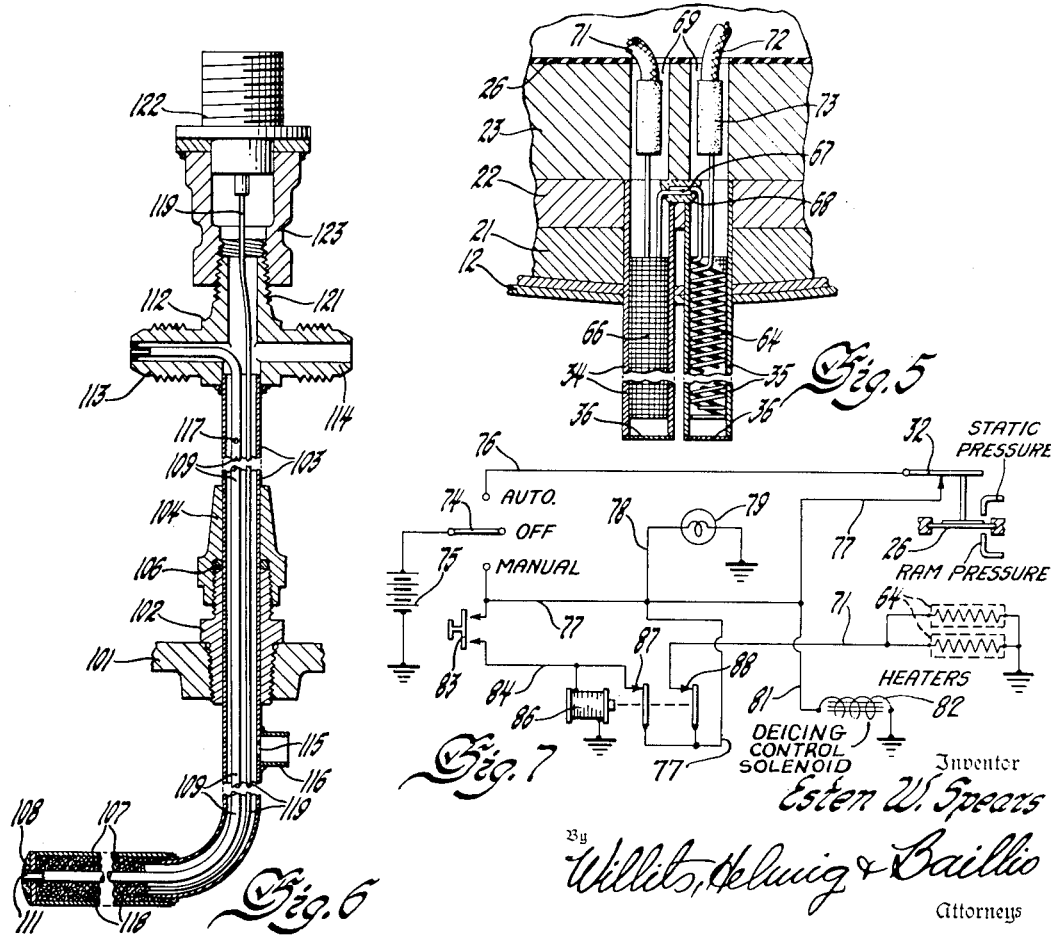

2,744,992
DEICING CONTROL

Esten W. Spears, Indianapolis, Ind., assignor to General Motors Corporation, Detroit, Mich., a corporation of Delaware Application March 30, 1951, Serial No. 218,478

8 Claims. (Cl. 219—20)

This invention relates to the control and prevention of the formation of ice in air ducts, and more particularly to means for sensing the onset of icing so that steps may be taken to prevent substantial formation of ice in the duct.

The invention is particularly intended for application to the air inlet of an aircraft gas turbine engine, and will be described in terms of this installation, although it is capable of use in other connections.

As is well known, aircraft gas turbine engines inspire great quantities of air and may, under certain atmospheric conditions, be troubled by the formation of ice on the surfaces of the air intake duct, which may seriously handicap the engine or even put it completely out of service. The onset of icing conditions may be quite sudden and the deposition of rime or glaze very rapid, so that it is most important that means be provided to prevent heavy deposits of ice. It is important, moreover, that the deicing system or means be brought into action with the greatest promptness when the need for it arises.

The reference herein to an air duct or to the air intake duct of a gas turbine is to be construed as referring not only to the walls of the duct as such, but also to screens, struts, or other structures such as the initial stages of a compressor supplied by the duct. In fact, the possibility of choking the engine is most acute when screens are present upon which a relatively light deposit of ice will cause a relatively great obstruction of the inlet, or when the ice forms upon the rather closely spaced inlet guide vanes of an axial-flow compressor.

Various schemes have been proposed for removing ice from the air duct or preventing its deposition. These include circulation of hot air from the compressor discharge or some other source, or hot oil returning from the bearings of the engine, through the struts in the air inlet or in heat exchange relation with the walls of the duct. Another proposal for deicing involves the provision of electric heaters for the duct and the structures therein. Another proposal involves the introduction of air heated by the combustion apparatus of the engine into the air inlet. Obviously, all of these schemes are disadvantageous to some extent and should not be employed when not needed, since heating of the inlet air decreases the power developed by the engine, and some of these schemes involve a rather heavy expenditure of power for heating.

It is important, therefore, to provide means sensitive to the presence of icing conditions which, either by means of a signal to the pilot or by automatic control means, will make possible the employment of the deicing installation only when it is needed.

My invention is concerned with responsive devices and control means for this purpose rather than with the nature of the deicing installation as such. As will be apparent from the succeeding description, the responsive or control means of the invention may be employed in connection with various arrangements for supplying heat to the duct to eliminate ice formation. Since many deicing arrangements are possible, I have restricted this disclosure to the control means, which may be advantageously employed with various deicing systems.

By way of introduction to the more detailed description of the invention, it may be stated that the principle of the invention lies in general in the provision of a probe or equivalent means in the air duct provided with two air openings so disposed with respect to the direction of air flow through the duct, or with respect to structures influencing the air flow, that a pressure differential is developed between these two openings by the flow of air through the duct. This pressure differential is utilized, preferable by a differential pressure actuated switch, to actuate indicating or controlling means. The operation depends upon the fact that obstruction of one or both of the air openings by ice forming thereon destroys the differential pressure and thereby causes a response by the differential pressure switch or the like. Preferably, the system includes both an indicator for signalling the pilot and means energized by the differential pressure responsive device to put the deicing system into operation. A further feature of the invention lies in the provision of means to heat and thereby deice the probe so that if the deicing conditions no longer exist the probes may be cleared to return the system to normal operation. When the probes are cleared, the heat is turned off, so that if icing conditions still exist this fact will be indicated by renewed obstruction of the air openings.

The principal objects of the invention are to provide an improved system for detecting the presence of conditions favorable to the formation of ice in an air duct, to provide such a device which may be quickly cleared of ice, to provide icing responsive probes or the like which are sensitive and reliable in operation and which may be readily installed, to provide an ice formation sensing device which has no power consumption under ice-free conditions, and to provide a device sensitive to the formation of ice having characteristics conforming to the characteristics of the environment in which it is installed, so that indications of icing conditions will conform accurately to the conditions which cause deposition of ice in the air duct or the like. The nature of the invention, the advantages thereof, and the preferred manner in which the objects are achieved will be more fully apparent to those skilled in the art from the subsequent detailed description of the preferred embodiments of the invention.

Referring to the drawings, Figure 1 is a front elevation of the inlet end of an exemplary gas turbine engine illustrating the installation of the icing detector of the invention; Figure 2 is a view, principally in section on a plane parallel to the axis of the duct, of the ice responsive apparatus; Figures 3, 4, and 5 are sectional views of the same taken on the planes indicated in Figure 2; Figure 6 is a longitudinal section of a second form of ice sensing probe; and Figure 7 is a typical circuit diagram of the indicating and control system.

In Figure 1, which is a view looking along the axis of the air entrance of an axial-flow compressor of an aircraft gas turbine engine, the outer wall of the annular air duct 10 is indicated at 11 and the inner wall at 12. These walls are joined by radial members 13, which may be struts, or which may be considered as representing the inlet guide vanes of an axial-flow compressor supplied through the air inlet passage 10. Engine accessories 14 and 16, the nature of which is immaterial to the invention, are illustrated as mounted within the wall 12. The inlet duct may be provided with screens (not shown) in accordance with common practice.

The ice detecting means of the invention comprise a pressure switch assembly indicated generally at 17 mounted within and fixed to the wall 12 and supporting a probe structure 18 extending into the duct 10.

The preferred structure of the elements 17, 18 is shown in some detail in Figures 2 to 5. Referring first to Figures 2 and 4, the wall 12 of the air duct has fixed thereto, by welding or in any other suitable manner, a mounting pad 21 which presents a flat upper surface. The detecting assembly comprises a flat plate 22 on which the probe structure 18 is mounted so as to extend through openings provided in the plate 21 and wall 12. A pressure switch bottom plate 23 is stacked on the plate 22 and a pressure switch upper body 24 is stacked on the plate 23, with the diaphragm 26 of a differential pressure switch serving as a gasket between the bodies 23 and 24. These parts are held assembled by cap screws 27, the threaded ends of which are received in the plate 21, which is tapped.

The plate 23 is formed to define an annular chamber 28 which is connected to the ram pressure conduit from the probe. A boss 29 provides a stop limiting downward movement of the diaphragm 26.

The upper body 24 is formed with a transverse hollow rib 31 which provides a chamber for a sensitive electric switch 32, the actuating mechanism therefor, and electrical conduits to the pressure switch and probe mechanism. The upper body 24 also defines a chamber 33 within which the upper surface of the diaphragm is subjected to static air pressure.

Considering now the structure of the probe with reference to Figures 2, 3, and 5, the probe comprises two tubes 34 and 35 extending into the air stream. These tubes extend transverse to the direction of air flow, which is from left to right in Figure 2, are parallel and closely adjacent each other, and are closed at their lower ends by plates 36. A V-shaped fairing 37 comprising two plates brazed to each other and to the tube 34 is located on the downwind side of the tube 34 and a generally similar fairing 38 is similarly mounted on the tube 35. The members 37 and 38 are closed at their lower ends by the plates 36 and constitute conduits by which the differential air pressures are conducted to the plate 22 and thence to the pressure switch assembly.

It will be noted that the tubes 34 and 35 and the interior plates of the members 37 and 38 define a Venturi throat through which air flows from left to right in Figure 3 when the compressor is in operation.

A total air pressure opening 39 is defined by a small air scoop 40 brazed to the conduit 38 and communicating with the conduit through an opening in the wall of the conduit. It will be noted that, since the opening 39 faces forward, it is in effect a Pitot tube and therefore the pressure communicated to the conduit 38 will be the total or ram pressure of the air.

The conduit 37 is formed with a small opening 41 on its inner face. This opening will receive the static pressure or, more accurately, a pressure somewhat less than the static pressure, which is transmitted through the conduit 37. It will be understood that the conduits 37 and 38 are brazed so as to be airtight.

The conduit 38 communicates through a passage 42 in the plate 22 and a passage 43 in the plate 23 with the ram pressure chamber 28. The conduit 37 communicates through a passage in the plate 22 lying behind the passage 42 in Figure 2, and a passage 44 through the plate 23 with the interior of the upper body 24 which constitutes the static pressure chamber 33 above the diaphragm.

Thus, when there is no air flow through the duct or when obstruction of one or both of the openings 39 and 41 by ice prevents the transmission of the pressure differential, the diaphragm 26 falls against the boss 29 as shown in Figures 2 and 4. Under normal operation of the engine in the absence of ice, the differential between the pressures sensed at the openings 39 and 41 lifts the diaphragm 26 as indicated by the broken line in Figure 4. This diaphragm is coupled to the switch 32 in such a way that the switch is closed when the diaphragm is down but is held open when the diaphragm is raised by the normal differential pressure.

A restricted bleed orifice is provided between the chambers 28 and 33 to provide equalization of pressures on the diaphragm in case the pressure sensing openings 39 and 41 should be closed by ice in such a manner as to trap the pressure in the switch. Referring to Figure 4, a passage 45 in the body 24 communicates with a passage 46 in the plate 23 through a hole in the diaphragm 26, the passages 45 and 46 connecting to the chambers 33 and 28, respectively. A threaded plug 47 formed with a small hole 50 is mounted in the passage 46. The size of the hole 50 is not critical; it must be small enough not to dissipate too much of the pressure differential under normal conditions, and must permit sufficient leakage to permit the diaphragm to drop if the openings 39 and 41 are closed.

The switch 32 is preferably of a commercially available type in which the contacts move with a snap action and may be actuated by relatively small force. The switch is supported on a bracket 48 secured to the wall of the body 24 by cap screws 49, the switch being held between the bracket 48 and a second bracket 51 by screws 52 extending through the body of the switch and threaded into the bracket 48. The lower ends of the brackets 48 and 51 comprise a clevis bored for a pin 53 which forms a fulcrum for a switch operating lever 54 which bears against the actuating pin 56 of the switch 32. The free end of the arm 54 is tapped for an adjusting screw 57 which may be locked in position by a jam nut 58. The lower end of the screw 57 bears against a pressure plate 59 cemented to the diaphragm 26. The adjustment of the screw 57 provides for adjustment of the operating point of switch 32 with respect to movement of the diaphragm 26. Access for adjustment of the screw 57 is provided by a plug 61 screwed into the top of the body 24.

The switch 32 is coupled by leads 62 to an electrical connector assembly 63 mounted on the body 24. This connector may be a standard aircraft fitting for connecting leads of any suitable type and is therefore not described in detail. It should be sealed to prevent air leakage.

The means for heating the probe for deicing comprises an electric resistance heater in each of the tubes 34 and 35. This heater may be of a commercially available type comprising a coiled resistance wire 64 (Figures 2 and 5) embedded in a heat resisting ceramic insulating material 66, the entire heater being inserted in the tube 34 or 35. As illustrated in Figures 2 to 5, inclusive, the heater elements are connected in series, the ends of the resistance wires being brazed together at 67, the junction being mounted in an insulating sleeve 68 in an opening between the tubes 34 and 35. The remaining leads from the heaters extend through passages 69 in the plate 23 and are connected to leads 71 and 72. The lead 71 is connected to one contact of the connector 63 and the lead 72 is grounded to the body of the device. Insulating sleeves 73 protect the heater leads against grounding. Obviously, the heaters 64 may be connected in parallel if desired, as indicated in Figure 7.

It is believed that the operation of the probe and pressure switch will be clear from the foregoing, but it may be reviewed briefly. Under normal conditions of engine operation, the ram pressure exerted through the opening 39 being greater than the static pressure exerted through the opening 41, the pressure in the chamber 28 exceeds that in the chamber 33 by an amount sufficient to lift the arm 54 and hold the switch 32 open against the force of the spring in the switch which tends to close the switch. If, however, either the ram pressure or static pressure opening is obstructed by ice, this pressure differential is destroyed and the switch forces the diaphragm down to the position illustrated, closing the contacts of the switch.

The operation of the switch in connection with the deicing system and the actuation of the probe heaters 64 will be clear in connection with Figure 7, which is a circuit diaphragm of a preferred control system. The system is energized by a source of current, indicated as a battery 75 which is connected to ground and to a single pole three position switch 74, the three positions of which are indicated as Automatic, Off, and Manual. With the switch 74 in the Off position, the entire system is deenergized. With the switch in the Automatic position, the battery is coupled through line 76 to the normally open switch 32. When the switch 32 closes due to the presence of icing conditions, the battery is coupled to a lead 77, one branch 78 of which energizes a signal light 79 so located as to be visible to the pilot. A second branch 81 of the lead 77 energizes a solenoid 82 which, in any manner appropriate to the deicing system to be controlled, puts the air duct deicing system into operation. Obviously, the solenoid 82 may operate a relay contact to energize electric heaters, may operate a valve to supply hot air to the air duct, or may actuate any other instrumentality suitable to the particular deicing installation. With the switch 74 in the Automatic position, the deicing system control solenoid 82 will remain energized as long as ice affects the operation of the switch 32.

In the operation of aircraft, conditions conducive to icing may be highly transitory. In other words, the aircraft may rapidly pass through a zone of air under such conditions of temperature and humidity as are conducive to icing. Since it is undesirable to continue the operation of the deicing system after the need for it has passed, and since the ice formation on the probe may persist after the plane has passed through the icing zone, means are provided in the system so that the pilot may heat and thereby deice the probe rapidly so as to determine whether ice will continue to form on the probe. This action is initiated by a normally open manually operated switch 83 which connects the line 77 to a conductor 84 through which a relay coil 86 is energized. When energized, the relay 86 completes a self-holding circuit from the line 77 through its front contacts 87. It also completes a circuit from line 77 through front contacts 88 to the line 71 through which the heaters 64, which are illustrated in this figure as connected in parallel, are energized.

Thus, when the switch 83 is closed, the relay 86 holds itself energized and maintains the heaters 64 energized until the probe is deiced sufficiently to transmit the normal pressure differential to the diaphragm 26. When this occurs, the switch 32 is opened, deenergizing the circuits to the lamp 78, the deicing control solenoid 82, the heaters 64, and the relay 86, which opens its holding circuit upon deenergization. If the icing conditions persist, the switch 32 will again be closed as before and the signal 79 and deicing solenoid 82 will be energized. If the icing conditions no longer exist, this will be indicated to the pilot by the non-energization of the lamp 79, and the deicing system will remain inoperative.

If the pilot desires for any reason to operate the deicing apparatus without recourse to the automatic control, he may move the switch 74 to the Manual position, directly energizing the line 77 and bypassing the switch 32. In this case, the deicing control solenoid is directly energized, as well as the lamp 79 which signals the operation of the deicing system. The probe heaters 64 may be energized if desired in the same manner previously described, but in this case will remain energized as long as the switch 74 is in the Manual position.

The form of ice sensing probe illustrated in Figure 6 is intended for use in a system of the kind previously described. The probe differs structurally from that previously described, and is intended for connection to a separate pressure switch assembly. In some cases the form of Figure 6 might be preferable, although the form illustrated in Figures 2 to 5 is the presently preferred form. The probe of Figure 6 is intended for mounting on a wall 101 of an air duct, the wall being thickened and tapped to receive a mounting fitting 102 provided with tapered threads. The probe comprises an outer tube 103 which passes through the internal bore of the fitting 102 and is held in place by a gland nut 104 threaded into the upper end of the fitting 102 and compressing a gasket 106. The end of the tube 103 which projects through the wall 101 into the air stream is bent forwardly into the direction of air flow and has brazed thereon a shell 107, the forward end of which is closed by a somewhat domed cap 108 brazed unto the shell. A small diameter tube 109 running through the outer tube 103 terminates in an opening 111 in the center of the cap 108, thus constituting a Pitot tube. The tubes 103 and 109 extend outwardly to a cross fitting 112 brazed to the outer end of the tube 103. The tube 109 is brazed or otherwise sealed in one arm 113 of the cross which is threaded to receive a conduit to convey the ram pressure to a pressure switch.

The arm 114 of the cross is similarly threaded for a static pressure line to the pressure switch and is in direct communication with the interior of the tube 103. A small static pressure opening 115 is made in the downstream face of the tube 103 within the air duct. The opening 115 is located within a short sleeve or tube 116 brazed to the tube 103 which tends to shield the opening 115 against ice formation. Ice formation on this probe will normally occur on the forward face so as to close the opening 111.

Actually, the pressure sensed at the opening 115 may be less than static pressure because of the downstream disposition of this opening, but since this merely increases the differential between the two pressures, it is most probably an advantage.

A very small orifice 117 is formed in the wall of the tube 109 to provide for a pressure bleed between the ram and static pressure conduits. An electric heater 118 of coiled resistance wire is mounted in the shell 107 and is energized by a lead 119 which is carried through the tube 103 and the upper arm 121 of the cross 112 to a conduit connector 122 mounted on the upper end of the cross in any convenient manner, as by being secured to a sleeve 123 screwed on to the taper threaded arm 121. The connector 122 may be sealed in any suitable manner to prevent air leakage, the connector 122 and lead 119 thus providing means for energizing the heater 118, the other end of the heater being grounded to the shell 107 and thus to the wall 101.

To use the ice sensing probe of Figure 6, the connections 113 and 114 are coupled to a differential pressure responsive device of any suitable type, which may, for example, be a differential pressure switch such as that illustrated in Figures 2 and 4. The difference between the ram pressure at the opening 111 and the static pressure or less at the opening 115 will actuate the pressure responsive device under normal conditions. If icing conditions are encountered, the more exposed opening 111 is most likely to be blocked, but, if either opening is blocked, the differential pressure across the responsive device is rapidly dissipated through the orifice 117, and the presence of icing conditions is thus apparent to the responsive device, which may operate a signal or energize a deicing apparatus by means or circuits such as those shown in Figure 7, or in any other suitable manner.

For the reasons previously discussed in connection with the other form of probe, it may be desirable to melt the ice off the Pitot opening 111, which may be accomplished by energizing the heater 118 in any desired manner.

It has been found by experience that the probe of Figures 2 and 3 more accurately parallels in its response to icing conditions the actual formation of ice on typical engine inlet structures with which it has been tried. This is believed to be due to the fact that with the probe of Figure 6 the heating of the air due to compression against the head of the probe may prevent icing of the probe even though icing may occur on structures which it is desired to protect. Due to the Venturi action of the preferred form of probe, there is some expansion of the air to compensate for this effect, so that a truer and more consistent response is obtained over the general range of icing conditions.

It will be understood that the invention is capable of various modifications within the scope of skill in the art and within the principles of the invention. The scope of the invention is not to be regarded as limited by the detailed description of the preferred embodiments of the invention for the purpose of explaining the principle thereof.

I claim:

1. An apparatus for sensing icing conditions in an air stream comprising, in combination, means adapted to extend into the stream, the said means presenting two openings into the air stream so disposed as to be subjected to different pressures as a result of air flow in the stream, differential pressure responsive means connected to be biased by the difference of the said pressures, means providing a restricted bleed orifice between the said openings, so that obstruction of one or both of the said openings terminates the pressure differential on the responsive means, means actuated by the responsive means to indicate the condition thereof, manually energizable means for heating the first-named means, means actuated by the responsive means for deenergizing the heating means in response to differential pressure therein, and means actuated by the responsive means in response to subnormal differential pressure therein to actuate a deicing system independent of the heating means for said first-named means.

2. An apparatus for detecting icing conditions in an air stream comprising, in combination, a body defining a passage for air flowing in the stream, the passage comprising a throat and a portion diverging downstream from the throat, means in the said diverging portion defining a ram pressure opening facing upstream, means in the said diverging portion defining a second opening so disposed as to be subject to a pressure less than ram pressure, conduit means for connecting the said openings to a differential pressure responsive device, and means providing a restricted bleed between the conduits.

3. An apparatus for detecting icing conditions in an air stream comprising, in combination, a body defining a passage for air flowing in the stream, the passage comprising a throat and a portion diverging downstream from the throat, means in the said diverging portion defining a ram pressure opening facing upstream, means in the said diverging portion defining a second opening so disposed as to be subject to a pressure lower than ram pressure, conduit means for connecting the said openings to a differential pressure responsive device, and means for heating the body at will to deice the same.

4. An apparatus for detecting icing conditions in an air stream comprising, in combination, a body comprising two struts defining a passage therebeween for air flowing in the stream, the passage comprising a throat and a portion diverging downstream from the throat, means in the said diverging portion defining a ram pressure opening facing upstream, means in the said diverging portion defining a second opening so disposed as to be subject to a pressure less than ram pressure, and conduit means for connecting the said openings to a differential pressure responsive device.

5. An apparatus for detecting icing conditions in an air stream comprising, in combination, a body comprising two struts defining a passage therebetween for air flowing in the stream, the passage comprising a throat and a portion diverging downstream from the throat, means in the said diverging portion defining a ram pressure opening facing upstream, means in the said diverging portion defining a second opening so disposed as to be subject to a pressure less than ram pressure, conduit means in each strut for connecting the said openings to a differential pressure responsive device, and means for heating the struts at will to deice the openings.

6. An apparatus for controlling icing in an air duct comprising, in combination, means responsive to the deposition of ice in the duct including a member normally resting in a first position and moving to a second position when ice is deposited, means actuated by the member in its second position to effect deicing of the duct, optionally energizable means for selectively heating the responsive means to remove ice therefrom including holding means, and means actuated by movement of the member to its first position to inactivate the holding means.

7. An apparatus for controlling icing in an air duct comprising, in combination, means responsive to the deposition of ice in the duct including a differential pressure sensing probe in the duct, a differential pressure responsive device actuated by the differential pressures sensed by the probe, and a member actuated by the differential pressure responsive device normally resting in a first position and moving to a second position when ice is deposited on the probe, means actuated by the member in its second position to effect deicing of the duct, optionally energizable means for selectively heating the probe to remove ice therefrom including holding means, and means actuated by movement of the member to its first position to inactivate the holding means.

8. An apparatus for controlling icing in an air duct comprising, in combination, means responsive to the deposition of ice in the duct including a switch normally resting in a first position and moving to a second position when ice is deposited, means actuated by the switch in its second position to effect deicing of the duct, indicating means actuated by the switch in its second position, optionally energizable means for selectively heating the responsive means to remove ice therefrom including holding relay means, and means actuated by movement of the switch to its first position to deenergize the holding relay means.

References Cited in the file of this patent

UNITED STATES PATENTS

| | | |
|---|---|---|
| 1,971,534 | Peace, Jr. | Aug. 28, 1934 |
| 2,042,700 | Colvin | June 2, 1936 |
| 2,208,689 | Sulzman | July 23, 1940 |
| 2,229,740 | Helmore | Jan. 28, 1941 |
| 2,338,574 | Cunningham | Jan. 4, 1944 |
| 2,404,275 | Clark et al. | July 16, 1946 |
| 2,469,375 | Flagle | May 10, 1949 |
| 2,541,512 | Hahn | Feb. 13, 1951 |
| 2,566,813 | Thorsen | Sept. 4, 1951 |

FOREIGN PATENTS

| | | |
|---|---|---|
| 446,983 | Great Britain | May 11, 1936 |